(12) United States Patent
Wu et al.

(10) Patent No.: US 11,655,348 B2
(45) Date of Patent: May 23, 2023

(54) METHOD FOR MANUFACTURING POLYIMIDE COMPOSITE FILM FOR FLEXIBLE METAL-CLAD SUBSTRATE

(71) Applicant: TAIMIDE TECHNOLOGY INCORPORATION, Hsinchu Hsien (TW)

(72) Inventors: Jia-Hao Wu, Hsinchu Hsien (TW); Chia-Ying Chou, Hsinchu Hsien (TW); Chun-Yi Cheng, Hsinchu Hsien (TW)

(73) Assignee: TAIMIDE TECHNOLOGY INCORPORATION, Hsinchu Hsien (TW)

( * ) Notice: Subject to any disclaimer, the term of this patent is extended or adjusted under 35 U.S.C. 154(b) by 150 days.

(21) Appl. No.: 17/355,204

(22) Filed: Jun. 23, 2021

(65) Prior Publication Data
US 2022/0411594 A1 Dec. 29, 2022

(51) Int. Cl.
*C08J 5/18* (2006.01)
*C08J 7/04* (2020.01)
*C08J 3/11* (2006.01)
*C08G 73/10* (2006.01)
*C08J 3/24* (2006.01)
*C08L 33/24* (2006.01)

(52) U.S. Cl.
CPC ............ *C08J 5/18* (2013.01); *C08G 73/1003* (2013.01); *C08J 3/11* (2013.01); *C08J 3/247* (2013.01); *C08J 7/0427* (2020.01); *C08L 33/24* (2013.01); *C08J 2333/24* (2013.01)

(58) Field of Classification Search
CPC ......... C08L 33/24; C08L 79/08; C08G 73/14; C08G 73/16; C08G 73/18; C09D 179/08; C08J 2379/08; C08J 5/18
See application file for complete search history.

(56) References Cited

U.S. PATENT DOCUMENTS 3,770,566 A * 11/1973 Gerow .................. B32B 27/322
428/473.5

* cited by examiner

*Primary Examiner* — Christopher M Rodd

(57) ABSTRACT

A method for manufacturing a polyimide composite film for a flexible metal-clad substrate includes the following steps, providing a polyamide acid solution; providing fluorine polymer particles and mixing the fluorine polymer particles with a dispersant and an organic solution to prepare a fluorine polymer particle dispersion; forming a colloidal polyimide film from the polyamide acid solution; and coating the colloidal polyimide film with the fluorine polymer particle dispersion and then performing baking to form a polyimide composite film.

7 Claims, 2 Drawing Sheets

METHOD FOR MANUFACTURING POLYIMIDE COMPOSITE FILM FOR FLEXIBLE METAL-CLAD SUBSTRATE

BACKGROUND OF THE INVENTION

1. Field of the Invention

The present disclosure relates to a method for manufacturing a polyimide composite film for a flexible metal-clad substrate, in which a colloidal polyimide film is coated with a fluorine polymer particle dispersion and then baked to form a film, thereby achieving the effect of improving the yield of the polyimide composite film.

2. Description of the Related Art

Flexible printed circuit boards that can be bent have been widely used in various electronic products in daily life, such as: mobile phones, tablet devices, notebook computers, and other products. Such a flexible printed circuit board and its covering substrate must consider the electrical properties, heat resistance, chemical resistance and dimensional stability of the material. Therefore, polyimide is usually used as the substrate of the flexible printed circuit board and the covering layer.

In recent years, with the advent of 5G high-frequency transmission applications, due to the high transmission frequency and high data transmission volume, signal loss may occur during transmission. In order to effectively reduce the signal loss, the reduction of the dielectric constant (Dk) and dielectric loss (Df) of the polyimide film is particularly important. The Dk and Df of the polyimide film may be reduced by the molecular structure design. However, in terms of its current limit, Dk is still higher than 3.0 and Df is higher than 0.004 at 10 GHz.

Among various types of polymer materials, fluorine polymer is known to have low Dk and Df, with Dk≤2.5 and Df<0.001 at 10 GHz. Therefore, relevant developers try to use it as a metal-clad substrate material. For example, glass fiber cloth is impregnated with fluorine polymer and pressed with copper foil to make a substrate. In another example, fluorine polymer is coated on polyimide film, which is then pressed with copper foil.

There is a method for manufacturing a polyimide composite film for a flexible metal-clad substrate, in which a fluorine polymer particle dispersion is coated on the surface of a polyimide film prepared in advance, dried, and then melted in a high-temperature oven to form a film. However, in the continuous roll-to-roll coating production process, the surface energy difference between the dried fluorine polymer particles and the polyimide film is too large, and the affinity between the two interfaces is very poor, which makes the fluorine polymer particles in the surface layer of the polyimide film prone to fall off, causing problems such as film surface defects and production line pollution, thus restricting the use and production of the composite film. Moreover, as the fluorine polymer is baked at a high temperature after being coated on the surface of the polyimide film, the fluorine polymer shrinks during melting such that the composite film is curled or exhibited unevenly wavy, which affects the yield. In addition, the preparation method of the above-mentioned composite film completes the production of the polyimide film substrate first, and then coats with the fluorine polymer particle dispersion, which requires more than two coating processes and high-temperature processes and thus has a considerable degree of influence on the cost and yield.

BRIEF SUMMARY OF THE INVENTION

A method for manufacturing a polyimide film for a flexible metal-clad substrate of the present invention is characterized in including the following steps: providing a polyamide acid solution; providing fluorine polymer particles and mixing the fluorine polymer particles with a dispersant and an organic solution to prepare a fluorine polymer particle dispersion; forming a colloidal polyimide film from the polyamide acid solution; and coating the colloidal polyimide film with the fluorine polymer particle dispersion and then performing baking to form a polyimide composite film.

Therefore, the present invention has the following effects: 1. the adhesion between the fluorine polymer particle layer and the colloidal polyimide film during the production process is improved, thereby preventing film surface defects and production line pollution caused by powder falling during production; 2. the single-sided or double-sided composite layer coating can be completed directly in the polyimide film production process, which can shorten and simplify the manufacturing process of the composite film and avoid curling; and 3. the present invention can improve the adhesion between the metal foil and the composite film in the flexible metal-clad substrate.

DETAILED DESCRIPTION OF THE INVENTION

To facilitate understanding of the object, characteristics and effects of this present disclosure, embodiments together with the attached drawings for the detailed description of the present disclosure are provided.

Figure 1:
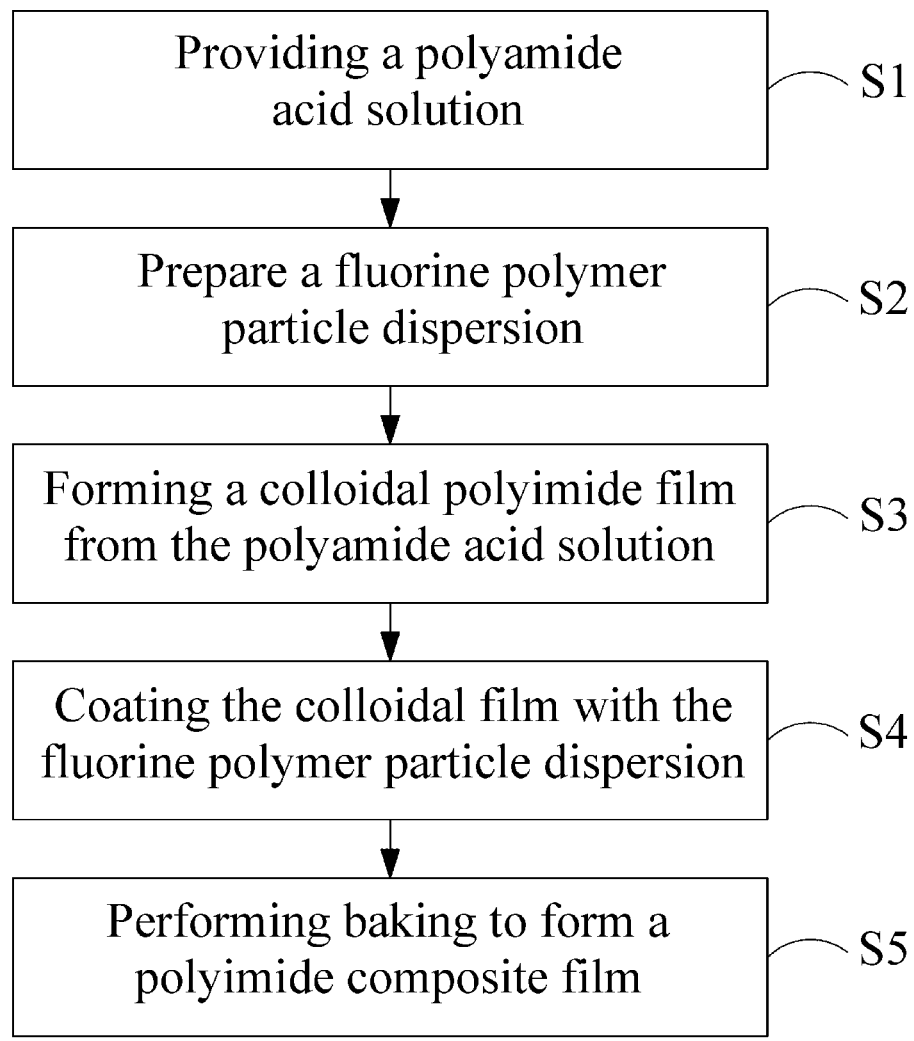
FIG. 1 is a flow chart showing a method for manufacturing a polyimide composite film for a flexible metal-clad substrate of the present invention.
Figure 2:
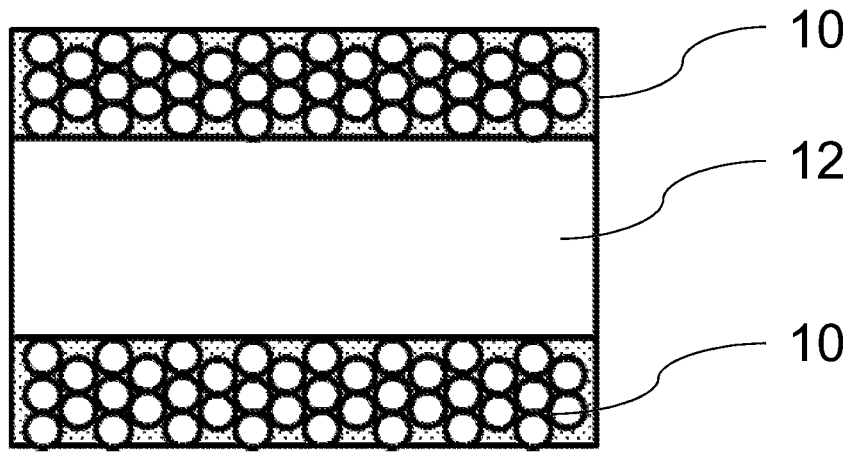
FIG. 2 is the first schematic view of the present invention.
Figure 3:
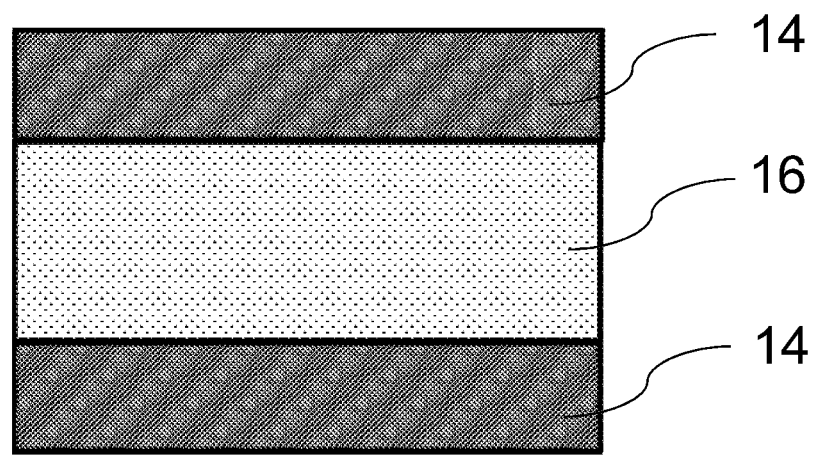
FIG. 3 is the second schematic view of the present invention.

With reference to FIGS. 1-3, a method for manufacturing a polyimide composite film for a flexible metal-clad substrate of the present invention comprises the following steps: providing a polyamide acid solution (S1), which is obtained by mixing and reacting a diamine and a dianhydride; providing fluorine polymer particles and mixing the fluorine polymer particles with a dispersant and an organic solution to prepare a fluorine polymer particle dispersion 10 (S2); forming a colloidal polyimide film 12 from the polyamide acid solution (S3); and coating both sides of the colloidal polyimide film 12 with the fluorine polymer particle dispersion 10 (S4) and then performing baking to form a fluorine polymer layer 14 and a polyimide film 16 from the fluorine polymer particle dispersion 10 and the colloidal polyimide film 12 respectively, thereby forming a polyimide composite film (S5).

Step S1: Preparation of the Polyamide Acid Solution

One or more diamine monomers and one or more dianhydride monomers are provided for mixing and reacting to polymerize into a polyamide acid solution.

The diamine monomer can be: 4,4'-diaminodiphenyl ether (4,4'-ODA), 3,4'-diaminodiphenyl ether (3,4'-ODA), m-phenylenediamine (MPD), p-phenylenediamine (PPD), 2,2'-bis(trifluoromethyl)diamino biphenyl (TFMB), 4,4'-diaminodiphenyl-2,2-propane, 4,4'-diaminodiphenylmethane, 4,4'-diaminodiphenylamine, benzidine, 4,4'-diaminodiphenyl sulfide, 4,4'-diaminodiphenyl sulfone, 3,3'-diaminodiphenyl sulfone, 4,4'-diamino-2,2'-dimethyl-1,1'-biphenyl, 4,4'-diamino-3,3'-1,1'-dimethylbiphenyl, 1,5-diaminonaphthalene, 3,3'-dimethoxybenzidine, 1,4-bis-(p-aminophenoxy)-benzene, 1,3-bis-(p-aminophenoxy)-benzene or any mixtures thereof.

The dianhydride monomer can be: pyromellitic dianhydride (PMDA), 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyl tetracarboxylic dianhydride, 2,2-bis-(3,4-dicarboxyphenyl)-propane dianhydride, bis-(3,4-dicarboxyphenyl)-sulfuric dianhydride, bis-(3,4-dicarboxyphenyl)-ether dianhydride, 2,2-bis-(2,3-dicarboxyphenyl)-propane dianhydride, 1,1-bis-(2,3-dicarboxyphenyl)-ethane dianhydride, 1,1-bis-(3,4-dicarboxyphenyl)-ethane dianhydride, bis-(2,3-dicarboxyphenyl)-methane dianhydride, bis-(3, 4-dicarb oxyphenyl)-methane dianhydride, 3,4,3',4'-benzophenonetetracarboxylic dianhydride or any mixtures thereof.

Step S2: Preparation of the Fluorine Polymer Particle Dispersion

The fluorine polymers that can be used in the present invention include: polychlorotrifluoroethylene (PCTFE), fluorinated ethylene propylene copolymer (FEP), polyvinyl fluoride (PVF), polyvinylidene fluoride (PVDF), ethylene chlorotrifluoroethylene copolymer (ECTFE), tetrafluoroethylene perfluoroether copolymer (PFA), ethylene tetrafluoroethylene copolymers (ETFE) or a combination thereof. The fluorine polymer is dispersed in the organic solvent in the form of particles, and its average particle size is 1-20 microns, preferably 1-10 microns. If the particle size is too small, it is not easy to disperse, and if the particle size is too large, it is easy to cause uneven film surface. The melting point of the fluorine polymer should be between 260° C.~350° C., so that the particles can be baked and melted to form a film during the manufacturing process of the polyimide colloidal film. It also ensures the reliability of the flexible substrate during the subsequent high-temperature manufacturing process.

The composition of the fluorine polymer particle dispersion includes: 10-60 wt %, preferably 30-50 wt %, of the fluorine polymer particles to ensure a tight structure between the particles after coating and drying; and 2-7 wt %, preferably 2-5 wt %, of a dispersant. If the addition amount of the dispersant is too low, the fluorine polymer particles will not be uniformly dispersed, and f the addition amount of the dispersant is too high, the characteristics of the fluorine layer will be affected. In addition, the polyamide acid solution can be further added to increase the structural stability of the fluorine layer, and should be added in an amount less than 20 wt % of the total solid content of the dispersion, preferably 10 wt % or less. An excessively high addition amount will reduce the dielectric properties of the fluorine layer. The formulation method is: adding the fluorine polymer particles to the mixed solvent of the dispersant and the solvent, and performing dispersion with a homogenizer for 2 hours. In another example, after the above dispersion is completed, a 20% polyamide acid solution is further added and mixed with a homogenizer.

Step S3: Preparation of Colloidal Polyimide Film Substrate

A dehydrating agent such as acetic anhydride and a catalyst such as triethylamine, pyridine, isoquinoline or picoline are mixed in the polyamide acid solvent, which is then coated on the support and backed at a temperature of 50~150° C. to form into a colloidal film. The solvent content of the colloidal polyimide film is controlled by the baking temperature curve of the oven, and the baking temperature ranges from 50 to 150° C. The solvent content of the colloidal polyimide film is between 20-60 wt %. A solvent content higher than 60 wt % will cause defects on the surface of the film in the high temperature section, and a solvent content less than 20 wt % will not have good affinity with the fluorine polymer particles.

Step S4: Coating of the Fluorine Polymer Particle Dispersion

The fluorine polymer particle dispersion can be coated on one side or both sides of the colloidal polyimide film. The coating method is not limited, and slot die, micro gravure, comma coating, and roll coating can be used.

Step S5: Baking for Forming the Polyimide Composite Film

The fluorine polymer particle dispersion is coated on the colloidal polyimide film and then baked in the high temperature section. The temperature of the high temperature oven is between 150 and 550° C., and the maximum temperature is preferably 350 to 550° C. to ensure that the ring formation of the polyimide film is complete, the fluorine polymer particles are melted to form a film, and the film is stretched in the TD direction during baking to prevent the film surface from being uneven due to the shrinkage phenomenon.

In order to verify the efficacy of the present invention, a semi-finished polyimide composite film with the fluorine polymer particle layer dried but not yet melted into a film is taken out at the baking section below 200° C. to perform the cross-cut adhesive force test according to the ASTM D3359 specification.

Preparation of the Flexible Metal-Clad Substrate

The flexible metal-clad substrate of the present invention is formed by continuous pressing of the above-mentioned polyimide composite film and metal foil using a heated metal rolling machine or a double-belt hot press, and a vacuum flat plate hot press can also be used to evaluate the experimental results of the polyimide composite film. The composition of the metal foil is not particularly limited and may include metals such as copper, nickel and aluminum or alloys. An electrolytic copper foil or rolled copper foil is commonly used, and their thickness is also not particularly limited.

Example 1

Step S1: Preparation of the Polyamide Acid Solution

10 Kg (50 mole %) of 4,4'-diaminodiphenyl ether and 5.4 Kg (50 mole %) of p-phenylenediamine were dissolved in 157 Kg of dimethylacetamide (DMAc), then 10.9 Kg (50 mole %) of pyromellitic dianhydride and about 14.7 Kg (50 mole %) of 3,3',4,4'-biphenyltetracarboxylic dianhydride were added for reaction to obtain a 20% polyamide acid solution.

Step S2: Preparation of the Fluorine Polymer Particle Dispersion

After 30 Kg of dimethylacetamide solvent and 0.4 Kg of dispersant were mixed, 20 Kg of PFA particles were added to the above solution, and then stirred with a homogenizer at 5000 rpm for 2 hours to form a 40 wt % fluorine polymer particle dispersion.

Step S3: Preparation of Colloidal Polyimide Film Substrate

The polyamide acid solution, the dehydrating agent and the catalyst were mixed with a molar ratio of 1:2:1 for polyamide acid: dehydrating agent: catalyst, and then spread on the steel plate, baked in the oven and peeled off the steel plate to obtain a colloidal polyimide film with a solvent content of 60%.

Step S4: Coating of Fluorine Polymer Particle Dispersion

Both sides of the colloidal polyimide film were coated with the fluorine polymer particle dispersion.

Step S5: Baking for Forming Polyimide Composite Film

In a high-temperature oven at a temperature between 150~550° C., baking was carried out in the high-temperature oven section to obtain a polyimide composite film with a fluorine polymer layer on both sides, in which the thicknesses of fluorine polymer layer/polyimide film/fluorine polymer layer were 12 um/50 um/12 um, and the appearance was evaluated.

During the baking, the semi-finished polyimide composite film with the fluorine polymer particle layer that has been dried but not yet melted into a film was obtained at the baking section below 200° C., and the cross-cut test was performed.

Preparation of Flexible Copper Clad Substrate

The above-mentioned polyimide composite film with a size of 20 cm×30 cm was taken and pressed with the copper foil (Mitsui Metals TQ-M4-VSP 12 um, Rz: 0.6 um) using the vacuum flat plate hot press. The pressing conditions was increasing the temperature from room temperature to 340° C. at 5° C. per minute, the temperature was kept at 340° C. for 10 minutes, the pressure was 30 Kgf/cm$^2$, and then the copper foil adhesion test was performed.

Solvent Content Test of Colloidal Polyimide Film

Solvent content of colloidal film=(weight of colloidal film-weight of dry film)×100/weight of colloidal film The dry film weight was the weight of the colloidal polyimide film after baking in an oven at 200° C. for 12 minutes.

Cross-Cut Test

According to ASTM D3359, the cross-cut test results are classified into 5B: no shedding; 4B: less than 5% shedding; 3B: 5~15% shedding; 2B: 15~35% shedding; 1B: 35~65% shedding; and 0B: more than 65% shedding.

Hand Touch Test

The fluorine polymer layer of the semi-finished polyimide composite film was pressed directly with the finger and observed whether there was peeling or powder falling.

Appearance Evaluation

An area of 20 cm×30 cm of the polyimide composite film was visually observed to confirm whether there were appearance defects caused by the shedding of the fluorine layer, and classified into A: no defects; B: less than 3 locations; and C: more than 3 locations.

Copper Foil Adhesion Test

The test method was based on the IPC-TM-650 2.4.9 standard to test the peel strength of the copper foil and polyimide composite film.

Example 2

The steps of Example 1 were repeated, except that in step S3, the baking temperature was controlled to obtain a colloidal polyimide film with a solvent content of 30%.

Example 3

The steps of Example 1 were repeated, except that in step S3, the baking temperature was controlled to obtain a colloidal polyimide film with a solvent content of 20%.

Example 4

The steps of Example 2 were repeated, except that 20 wt % of the polyamide acid, based on the total solid composition, was added to the fluorine polymer particle dispersion prepared in step S2, as in Step B.

Step B Preparation of the Fluorine Polymer Particle Dispersion

After 17.5 Kg of dimethylacetamide solvent and 0.4 Kg of dispersant were mixed, 25 Kg of the polyamide acid solution prepared in Step S1 and 20 Kg of PFA particles were added into the above solution and then stirred with a homogenizer at 5000 rpm for 2 hours to obtain a 40 wt % fluorine polymer particle dispersion.

Comparative Example 1

The steps of Example 1 were repeated, except that in step S3, the baking temperature was controlled to obtain a colloidal polyimide film with a solvent content of 70%.

Comparative Example 2

Repeat Steps S1 and S2 of Example 1, and proceed to Steps C, D and E.

Step C. Preparation of Polyimide Film Substrate

The polyamide acid solution, the dehydrating agent and the catalyst were mixed with a molar ratio of 1:2:1 for polyamide acid: dehydrating agent: catalyst, spread on the steel plate, baked in the oven, peeled off the steel plate, and then baked in the oven at high temperature section to obtain a polyimide film with complete reaction and drying as the substrate.

Step D: Coating of Fluorine Polymer Particle Dispersion

Both sides of the polyimide film prepared in Step C were coated with the fluorine polymer particle dispersion.

Step E: Baking for Forming Polyimide Composite Film

In a high-temperature oven at a temperature between 150~550° C., baking was carried out to obtain a polyimide composite film with a fluorine polymer layer on both sides, in which the thicknesses of fluorine polymer layer/polyimide film/fluorine polymer layer were 12 um/50 um/12 um, and the appearance was evaluated.

During the baking, the semi-finished polyimide composite film with the fluorine polymer particle layer that has been dried but not yet melted into a film was obtained at the baking section below 200° C., and the cross-cut test and hand touch test were performed.

Comparative Example 3

The steps of Comparative Example 2 were repeated, except that 20 wt % of the polyamide acid, based on the total solid composition, was added to the fluorine polymer particle dispersion prepared in step S2, as in Step B.

| | Substrate | Solvent content (wt %) | PAA addition amount of fluorine dispersion (wt %) |
|---|---|---|---|
| Example 1 | Colloidal polyimide film | 60 | — |
| Example 2 | Colloidal polyimide film | 30 | — |
| Example 3 | Colloidal polyimide film | 20 | — |
| Example 4 | Colloidal polyimide film | 30 | 20% |
| Comparative Example 1 | Colloidal polyimide film | 70 | — |
| Comparative Example 2 | Polyimide film | 0 | — |
| Comparative Example 3 | Polyimide film | 0 | 20% |

| | Cross-cut test of semi-finished product | Hand touch test of semi-finished product | Appearance test of finished product | Copper foil peeling force (Kgf/cm) |
|---|---|---|---|---|
| Example 1 | 2B | N | A | 0.70 |
| Example 2 | 3B | N | A | 1.03 |
| Example 3 | 2B | N | A | 0.95 |
| Example 4 | 4B | N | A | 1.10 |
| Comparative Example 1 | 1B | Y | C | 0.54 |
| Comparative Example 2 | 0B | Y | C | 0.43 |
| Comparative Example 3 | 1B | Y | C | 0.65 |

Examples 1 to 3 are compared with Comparative Example 2. Comparing the semi-finished products, the fluorine polymer particle dispersion coated on the colloidal polyimide film in the Examples has better adhesion than that being coated on the dry film, and no powder falls off upon direct touch. After step D is completed, the appearance of Examples 1 to 3 is significantly better than that of Comparative Example 2

Examples 1 to 3 are compared with Comparative Example 1. In the Examples, the fluorine polymer particle dispersion applied to the colloidal polyimide film significantly helps the adhesion of the fluorine coating layer. However, in Comparative Example 1, when the solvent content of the colloidal polyimide film is higher than 70%, the film surface cracks.

Example 2, Example 4 and Comparative Example 3 were compared. Comparing the semi-finished products, adding polyamide acid solution as the adhesive between the fluorine particles and coating on the colloidal film has a significant improvement in adhesion. Though Comparative Example 3 coating on the dry film is improved, its cross-cut test only promotes to B1.

Examples 1 to 4 have a significant increase in the adhesion to the copper foil because the adhesion between the polyimide base film and the fluorine polymer layer has increased.

While the present disclosure has been described by means of specific embodiments, numerous modifications and variations could be made thereto by those skilled in the art without departing from the scope and spirit of the present disclosure set forth in the claims.

What is claimed is:

1. A method for manufacturing a polyimide composite film for a flexible metal-clad substrate to attach a metal foil to the polyimide composite film, comprising:
   providing a polyamide acid solution;
   providing fluorine polymer particles and mixing the fluorine polymer particles with a dispersant and an organic solution to prepare a fluorine polymer particle dispersion, wherein a solid weight percentage of the fluorine polymer particle dispersion is greater than 30 wt %, wherein the fluorine polymer particle dispersion further includes a polyamide acid solution;
   forming a colloidal polyimide film from the polyamide acid solution, wherein a thickness of the colloidal polyimide film is greater than 12 μm; and
   coating the colloidal polyimide film with the fluorine polymer particle dispersion and then performing baking to form a polyimide composite film.

2. The method for manufacturing a polyimide composite film for a flexible metal-clad substrate of claim 1, wherein the polyamide acid solution is obtained by mixing and reacting a diamine monomer and a dianhydride monomer in an organic solution.

3. The method for manufacturing a polyimide composite film for a flexible metal-clad substrate of claim 1, wherein a solvent content of the colloidal polyimide film is between 20~60 wt %.

4. The method for manufacturing a polyimide composite film for a flexible metal-clad substrate of claim 1, wherein a baking temperature for forming the colloidal polyimide film is between 50 and 150° C.

5. The method for manufacturing a polyimide composite film for a flexible metal-clad substrate of claim 1, wherein a temperature for the baking is between 150 and 550° C.

6. The method for manufacturing a polyimide composite film for a flexible metal-clad substrate of claim 1, wherein the fluorine polymer particle dispersion is coated on both sides of the colloidal polyimide film.

7. The method for manufacturing a polyimide composite film for a flexible metal-clad substrate of claim 1, wherein a cross-cut test of a semi-finished product of the polyimide composite film is above 2B.

\* \* \* \* \*